United States Statutory Invention Registration [19]

[11] Reg. Number: H387

Kruka et al. [43] Published: Dec. 1, 1987

[54] WAVELENGTH FILTER FOR MARINE SEISMIC CABLES

[75] Inventors: Vitold R. Kruka; Edward R. Cadena, both of Houston, Tex.

[73] Assignee: Shell Oil Company, Houston, Tex.

[21] Appl. No.: 333,524

[22] Filed: Dec. 22, 1981

[51] Int. Cl.[4] ..... H04R 1/22; G01V 1/16

[52] U.S. Cl. ..... 367/154; 367/15

[58] Field of Search ..... 367/173, 152, 154, 157, 367/165, 166, 21, 15, 162, 106, 130, 901, 150, 155, 167, 172; 181/122, 0.5

[56] References Cited

U.S. PATENT DOCUMENTS

| | | | |
|---|---|---|---|
| 2,754,925 | 7/1956 | Burke | 367/152 |
| 3,737,004 | 6/1973 | Higgs | 367/152 |
| 3,781,778 | 12/1973 | Sawin et al. | 367/152 |
| 4,388,711 | 6/1983 | Fay | 367/154 |
| 4,445,207 | 4/1984 | Sternberg | 367/150 |

*Primary Examiner*—Nelson Moskowitz
*Assistant Examiner*—Gregory C. Issing

[57] ABSTRACT

A marine seismic cable comprising a core; a housing coupled to the core and having a cavity adapted for holding a hydrophone, the cavity being located on a first side of the housing; elastic material positioned in the cavity and extending beyond the boundary of the cavity, a hydrophone positioned in the elastic material in the cavity; and a rigid plate positioned adjacent to the elastic material.

14 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WAVELENGTH FILTER FOR MARINE SEISMIC CABLES

BACKGROUND OF THE INVENTION

This invention relates generally to seismic exploration of substrata beneath bodies of water and, more particularly, to a marine seismic cable for sensing reflected seismic waves from such substrata.

Marine seismic exploration is often conducted by towing a seismic streamer at a given depth through the ocean or other body of water. The streamer is provided with a plurality of acoustic sensitive transducers, that is hydrophones, disposed at appropriate intervals along the length thereof. Acoustic wave energy is provided in the vicinity of the cable by an air gun or other suitable means; this wave energy travels downwardly through the earth with a portion of it being reflected upwardly at levels where there is a contrast in the velocity propagation characteristics of the stratum. The hydrophones sense the acoustic pressure waves produced in the water by the upwardly traveling seismic reflections and provide electrical signals indicative thereof to suitable processing and recording equipment located on the seismic vessel that is towing the streamer.

The magnitude of the reflected signals is extremely small, thus making it essential to minimize extraneous noise detected by the hydrophones and to maximize the signal-to-noise ratio. One source of such noise is boundary layer or flow noise which is generated by the water flowing past the surface of the cable in a turbulent fashion. It has been found that flow noise is essentially a localized pressure disturbance, which is normal to the surface of the cable, and that flow noise does not propagate in the water in the acoustic sense but rather is convected by the water flowing past the cable.

Prior art cables have employed mounts, such as that disclosed in U.S. Pat. No. 3,781,778, which have a cavity in which the hydrophone is positioned in an elastic material, for example, polysulfide elastomer. A thin sheet of plastic film is positioned over the cavity, and a sheath or jacket of extruded plastic is provided over the outside of the cable and the mount. The flow noise or pressure fluctuations are transmitted through the cable sheath, the thin plastic sheet and elastic material to the hydrophone, thus being detected as undesired noise.

Therefore, it is an object of the present invention to provide a marine seismic cable that reduces the flow noise sensed by a hydrophone mounted in the cable.

SUMMARY OF THE INVENTION

In accordance with the present invention there is provided a marine seismic cable comprising a core, a housing, elastic material, a hydrophone and a rigid plate. The housing is coupled to the core and has a cavity that is located on a first side of the housing, such cavity being adapted for holding a hydrophone. The elastic material is positioned in the cavity and extends beyond the boundary thereof. The hydrophone is positioned in the elastic material in the cavity, and the rigid plate is positioned adjacent to the elastic material.

The seismic signals in the normal seismic band have a frequency range of 6 to 150 hertz and travel through seawater at the sonic velocity of about 4850 feet per second. The wavelengths of the seismic signals are determined by dividing the velocity of the signal by the frequency of the signal and range from approximately 30 to 800 feet. It has been found that the flow noise propagates along the cable at approximately 80% of the cable velocity. Generally, the cable is towed at approximately 6 knots; hence, the flow noise in the seismic band has wavelengths ranging from approximately 0.05 to 1.35 feet. The present invention differentiates between the desired seismic signals and flow noise on the basis of the respective wavelengths, since signal transmission through an intervening medium is wavelength dependent. Therefore, the present invention employs a rigid plate or predetermined thickness which attenuates the flow noise signals and transmits the seismic signals with little or no attenuation. The plate or wavelength filter can be made of stainless steel or other suitable material and preferably is at least as large as the opening of the cavity in which the hydrophone is positioned. The wavelength filter is separated from the mount by a layer of elastic material, such as polysulfide elastomer, positioned on the surface of the mount. The layer of elastic material can be connectd to and be part of the elastic material in the hydrophone cavity, or it can be a separate body of elastic material. Preferably, the elastic material on the surface of the mount, as well as the elastic material in the cavity, has a sonic velocity substantially equal to that of seawater. Other objectives, advantages and applications of the present invention will be made apparent by the following detailed description of the preferred embodiments of the present invention.

DETAILED DESCRIPTION OF THE PREFERRED EMBODIMENTS

Figure 1:
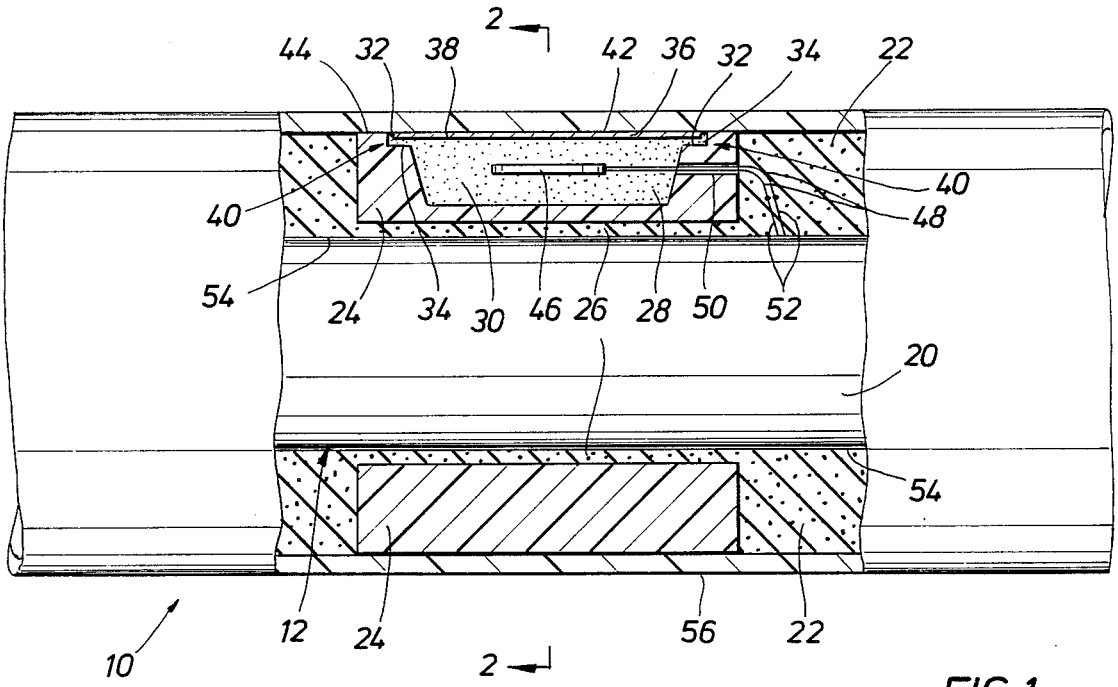
FIG. 1 is a sectional view in side elevation of a seismic streamer according to the present invention.
Figure 2:
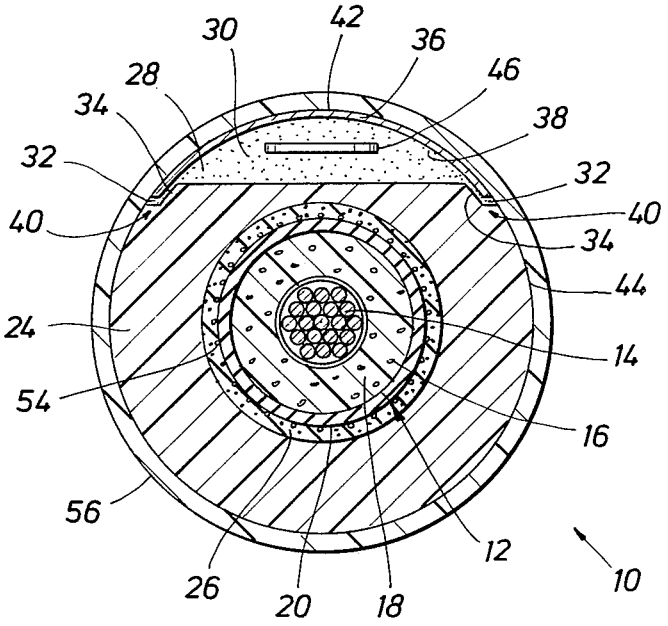
FIG. 2 is a cross section taken along line 2—2 of FIG. 1.

Referring to FIGS. 1 and 2, a section of a marine seismic cable according to the present invention is indicated generally by numeral 10. Cable 10 has a core 12 which consists of a stess member 14, which can be a flexible steel cable or a synthetic fiber rope, and a plurality of electrical conductors 16 disposed around stress member 14. The voids between conductors 16 are filled with a suitable filler compound 18, and a jacket 20 of urethane or other suitable material is extruded over the outer portion of conductors 16 and filler 18. Core 12 is disposed axially within a cylindrical body of flotation material 22, such as soft urethane having embedded glass or plastic microspheres or balloons, to provide the desired buoyancy.

At discrete locations along cable 10 a portion of flotation material 22 is removed so that a cylindrical hydrophone mount 24 can be positioned around a thin layer or cushion 26 of flotation material 22 remaining around core 12. Mount 24 has an inside diameter that is substantially the same as the outside diameter of cushion 26 and an outside diameter that is substantially the same as the outside diameter of flotation material 22. Mount 24 can be formed of a rigid material, such as rigid polyurethane with embedded hollow glass spheres, and has a cavity 28 that is sized for holding a hydrophone. Preferably, mount 24 is a split mount having two interlocking halves which are connected together by two pins which are inserted through aligned apertures in the interlocking halves, as described in our copending U.S. patent application Ser. No. 333,527, and the sizes of cushion 26 and mount 24 are defined by the equation $$R_1R_3^2+R_1R_2^2-2R_2^3=0$$

where $R_1$ is the radius of core 12 and $R_2$ and $R_3$ are the inside and outside radii, respectively, of mount 24, as described in our copending U.S. patent application Ser. No. 333,526, both of which were filed on the same day as the instant application and are assigned to a common assignee.

Cavity 28 is filled with an elastic material 30 having a sonic velocity similar to that of seawater, such as polysulfide elastomer or other suitable elastic material. Elastic material 30 is sized and shaped so that it extends beyond the boundaries of cavity 28 and forms a layer 32 of elastic material 30 on the surface 34 of mount 24. Alternatively, a first body of elastic material can be positioned in cavity 28 and a second body or layer can be positioned on surface 34 of mount 24 and the top surface of the first body. A rigid plate 36 is positioned adjacent top surface 38 of elastic material 30. The area of plate 36 is larger than the area of the opening of cavity 28, so that the ends of plate 36 extend beyond the periphery of cavity 28. Preferably, mount 24 has notches 40 to accommodate the ends of layer 32 and plate 36 that extend beyond the periphery of cavity 28, so that top surface 42 of plate 36 and surface 44 of mount 26 are coplanar and form a smooth cylinder that has an outside diameter that is essentially the same as the outside diameter of flotation material 22. In this embodiment layer 32 of elastic material isolates the bottom surface and the ends of plate 36 so that plate 36 does not contact mount 24.

A hydrophone 46 is positioned in elastic material 30 such that it is displaced from the walls of cavity 28. Electrical leads 48 from hydrophone 46 are brought out through aperture 50 in the wall of mount 24 and are connected in a suitable manner to a pair of electrical conductors 52 from the set of electrical conductors 54 provided by the termination (not shown) of this section of cable 10. A sheath 56 of extruded plastic, for example, polyurethane plastic, is provided over flotation material 22, mount 24 and plate 36 to protect the outer surface of cable 10. If desired, sheath 56 can be eliminated over plate 36 so that top surface 42 of plate 36 is exposed to the marine environment.

The thickness of plate 36 is chosen so that plate 36 functions as a wavelength filter to attenuate the flow noise caused by the water flowing past the surface of cable 10 in a turbulent fashion. The thickness that provides the desired degree of attenuation is dependent on the type of material employed which can be, for example, stainless steel, and the wavelengths of the signals to be attenuated. The seismic signals in the normal seismic band have a frequency range of 6 to 150 hertz and travel through seawater at the sonic velocity of 4850 feet per second. The wavelengths of the seismic signals are determined by dividing the velocity of the signal by the frequency of the signal and range from approximately 30 to 800 feet. It has been found that the flow noise propagates along the cable at approximately 80% of the cable velocity. Generally, the cable is towed at approximately 6 knots; hence, the flow noise in the seismic band has wavelengths ranging from approximately 0.05 to 1.35 feet. Obviously, if cable 10 is towed at a greater speed the wavelengths of the flow noise would increase. For example, if cable 10 is towed at 12 knots, the maximum limit of the flow noise wavelengths would be approximately 2.7 feet. The thickness of plate 36 is chosen so that plate 36 attenuates the short wavelengths of the flow noise and passes the long wavelengths of the seismic signals. The approximate thickness can be determined empirically, or an approximate thickness can be determined by calculating the transmittance for a plane, infinite plate that is separating like media. The transmittance, $T_r$, which is the ratio of the transmitted pressure to the incident pressure is described as follows:

$$T_{rreal} = \frac{1}{1 + Q^2} \tag{1}$$

where $$Q = \left[1 - \left(\frac{k}{\gamma}\right)^4 \sin^4\theta\right] \frac{k\rho_p t}{2\rho} \cos\theta \tag{2}$$

$$k = 2\pi/\lambda \tag{3}$$

$$\gamma^4 = 48f_p^2\rho(1 - \mu^2)/Et^2 \tag{4}$$

In the above equations $\rho_p$ is the density of plate 36, $\rho$ is the density of the medium, that is, seawater, E is the Young's modulus of plate 36, $\mu$ is the Poisson ratio for plate 36, t is the thickness of plate 36, f is the frequency of the signal, $\lambda$ is the wavelength of the signal and $\theta$ is the incidence angle. Equations 1–4 provide an approximation of the degree of attenuation that can be achieved with a particular plate of predetermined thickness. In general, it has been found that a curved plate provides greater attenuation of the flow noise than is indicated by the results of equations 1–4.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A marine seismic cable comprising: a core; a housing coupled to said core and having a cavity adapted for holding a hydrophone, said cavity being located on a first side of said housing; elastic material positioned in said cavity and extending beyond the boundary of said cavity; a hydrophone positioned in said elastic material in said cavity; and a wavelength filter positioned adjacent said elastic material to attenuate flow noise signals having shortwave lengths relative to the wavelengths of seismic signals.

2. A marine seismic cable as recited in claim 1, wherein said elastic material extending beyond the boundary of said cavity comprises a layer of elastic material that is located adjacent to said housing and that prevents said wavelength filter from contacting said housing.

3. A marine seismic cable as recited in claim 2, wherein the area of the surface of said wavelength filter that is positioned adjacent to said elastic material is at least as large as the area of the opening of said cavity located on said first side of said housing.

4. A marine seismic cable as recited in claim 3, wherein said housing and said wavelength filter are curved.

5. A marine seismic cable as recited in claim 4, wherein said elastic material has a sonic velocity substantially equal to the sonic velocity of seawater.

6. A marine seismic cable as recited in claim 5, wherein said housing has a notch located on said first side around said cavity, said notch being sized so that said elastic material that extends beyond the boundary of said cavity together with said wavelength filter are positioned in said notch with a surface of said wavelength filter being coplanar with said first side of said housing.

7. A marine seismic cable as recited in claim 6, wherein said wavelength filter comprises a steel plate.

8. A marine seismic cable as recited in claim 2, wherein said wavelength filter has a predetermined thickness such that said filter attenuates pressure waves that are incident thereon and have wavelengths that are less than 1.35 feet.

9. A marine seismic cable as recited in claim 2, wherein said wavelength filter has a predetermined thickness such that said filter attenuates pressure waves that are incident thereon and have wavelengths that are less than 2.7 feet.

10. A marine seismic cable as recited in claim 3 or 4, wherein said housing and said wavelength filter are curved, said elastic material has a sonic velocity substantially equal to the sonic velocity of seawater, and the area of the surface of said filter that is adjacent to said elastic material is larger than the area of the opening of said cavity located on said first side of said housing.

11. A marine seismic cable as recited in claim 10, wherein said housing has a notch located on said first side around said cavity, said notch being sized so that said elastic material that extends beyond the boundary of said cavity together with said wavelength filter are positioned in said notch with a surface of said filter being coplanar with said first side of said housing.

12. A marine seismic cable as recited in claim 11, wherein said wavelength filter comprises a steel plate.

13. A hydrophone assembly for use in a marine cable, comprising:

a housing having a cavity therein for containing moldable material and mountable in said cable;

an acoustic energy transducer located in said moldable material; and means for substantially attenuating flow noise disposed between said transducer and the outer surface of said cable and for transmitting substantially unattenuated seismic signals to said transducer.

14. A method for reducing flow noise in a marine cable having at least one hydrophone therein, comprising:

attenuating short wavelength signals from said flow noise between the surface of said cable and said hydrophone and transmitting long wavelength seismic signals from the surface of said cable to said hydrophone.

* * * * *